United States Patent
Cho et al.

(10) Patent No.: US 11,593,487 B2
(45) Date of Patent: Feb. 28, 2023

(54) CUSTOM BASEBOARD MANAGEMENT CONTROLLER (BMC) FIRMWARE STACK MONITORING SYSTEM AND METHOD

(71) Applicant: Dell Products, L.P., Round Rock, TX (US)

(72) Inventors: Eugene David Cho, Austin, TX (US); Timothy M. Lambert, Austin, TX (US); Akkiah Choudary Maddukuri, Austin, TX (US); Chandrasekhar Mugunda, Austin, TX (US); Sreeram Veluthakkal, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 47 days.

(21) Appl. No.: 17/346,595

(22) Filed: Jun. 14, 2021

(65) Prior Publication Data

US 2022/0398319 A1 Dec. 15, 2022

(51) Int. Cl.
*G06F 21/57* (2013.01)
*G06F 9/4401* (2018.01)
*H04L 9/32* (2006.01)
*G06F 12/14* (2006.01)
*G06F 15/78* (2006.01)

(52) U.S. Cl.
CPC .......... *G06F 21/572* (2013.01); *G06F 9/4401* (2013.01); *G06F 12/1458* (2013.01); *H04L 9/3268* (2013.01); *G06F 15/7807* (2013.01); *G06F 2212/1048* (2013.01); *G06F 2221/033* (2013.01)

(58) Field of Classification Search
CPC .. G06F 21/572; G06F 9/4401; G06F 12/1458; G06F 15/7807; G06F 2212/1048; G06F 2221/033; H04L 9/3268
See application file for complete search history.

(56) References Cited

U.S. PATENT DOCUMENTS

| | | | | |
|---|---|---|---|---|
| 10,395,039 | B2 * | 8/2019 | Khatri | G06F 21/575 |
| 11,113,070 | B1 * | 9/2021 | Kulchytskyy | G06F 9/44505 |
| 11,397,593 | B1 * | 7/2022 | Lin | G06F 9/4401 |
| 2011/0213955 | A1 * | 9/2011 | Takai | G06F 9/4401 |
| | | | | 713/2 |
| 2012/0260258 | A1 * | 10/2012 | Regini | G06F 1/3287 |
| | | | | 718/104 |
| 2013/0179624 | A1 * | 7/2013 | Lambert | G06F 12/0246 |
| | | | | 711/E12.008 |
| 2016/0364570 | A1 * | 12/2016 | Stern | G06F 21/575 |
| 2017/0085383 | A1 * | 3/2017 | Rao | G06F 21/575 |
| 2019/0073478 | A1 * | 3/2019 | Khessib | G06F 21/70 |

(Continued)

*Primary Examiner* — Aurel Prifti
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes executable instructions for when a custom BMC firmware stack is executed on the BMC, monitoring a parameter of one or more of the hardware devices of the IHS. The instructions that monitor the parameter are separate and distinct from the instructions of the custom BMC firmware stack. The instructions also controls the BMC to perform one or more operations to remediate an excessive parameter when the parameter exceeds a specified threshold.

20 Claims, 5 Drawing Sheets

(56) References Cited

U.S. PATENT DOCUMENTS

| | | | |
|---|---|---|---|
| 2020/0042710 A1* | 2/2020 | Liu | G06F 21/575 |
| 2020/0134185 A1* | 4/2020 | Cho | G06F 21/602 |
| 2021/0326443 A1* | 10/2021 | Plaquin | H04L 9/0894 |
| 2021/0342169 A1* | 11/2021 | Heinrich | G06F 9/45508 |
| 2022/0237298 A1* | 7/2022 | Lambert | G06F 21/575 |

* cited by examiner

CUSTOM BASEBOARD MANAGEMENT CONTROLLER (BMC) FIRMWARE STACK MONITORING SYSTEM AND METHOD

FIELD

The present disclosure generally relates to electronics, and, more particularly, to a custom baseboard management controller (BMC) firmware stack monitoring system and method.

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

According to one embodiment, an Information Handling System (IHS) includes multiple hardware devices, and a baseboard Management Controller (BMC) in communication with the plurality of hardware devices. The BMC includes executable instructions for when a custom BMC firmware stack is executed on the BMC, monitoring a parameter of one or more of the hardware devices of the IHS. The instructions that monitor the parameter are separate and distinct from the instructions of the custom BMC firmware stack. The instructions also control the BMC to perform one or more operations to remediate an excessive parameter when the parameter exceeds a specified threshold.

According to another embodiment, a method includes the steps of monitoring a parameter of one or more of the hardware devices of the IHS when a custom BMC firmware stack is executed on the BMC. The instructions that monitor the parameter are separate and distinct from the instructions of the custom BMC firmware stack. The method also includes the steps of controlling the BMC to perform one or more operations to remediate an excessive parameter when the parameter exceeds a specified threshold.

According to yet another embodiment, a BMC includes computer-readable instructions for when a custom BMC firmware stack is executed on the BMC, monitoring a parameter of one or more of the hardware devices of the IHS. The instructions that monitor the parameter are separate and distinct from the instructions of the custom BMC firmware stack. The instructions also control the BMC to perform one or more operations to remediate an excessive parameter when the parameter exceeds a specified threshold.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
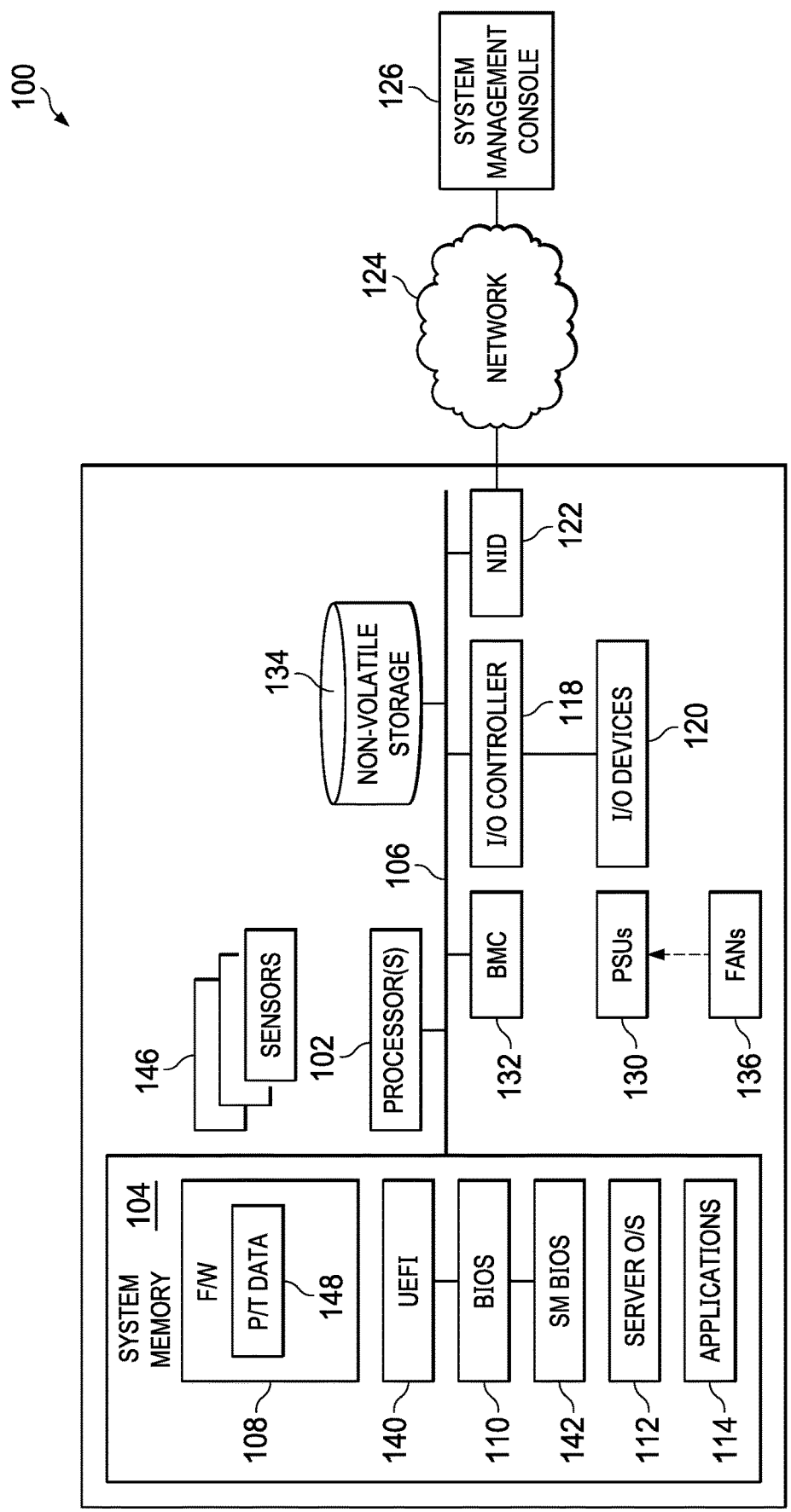
FIG. 1 is a block diagram of examples of components of an Information Handling System (IHS), according to one embodiment of the present disclosure.

Embodiments described herein comprise a secure shared memory system and method for baseboard management controllers (BMCs) that may be installed with custom BMC firmware stacks. Whereas custom BMC firmware stacks may be created and deployed with little or no control over how the BMC hardware or its associated IHS is configured, IHSs configured with BMCs should be provided with a secure storage location for deploying software, such as executable code and/or logfiles, that serve in a supervisory role to ensure that the actions of the custom BMC firmware stacks do not cause undue harm to its host IHS. Embodiments of the present disclosure provide a solution to this problem, among others, using a system and method that provides one or more secure memory spaces that are protected (e.g., hidden) from the potentially malicious actions of the custom BMC firmware stacks. Moreover, the secure memory spaces function within the existing frameworks of many BMC architectures to allow multiple components of BMCs to effectively communicate with one another outside the purview of these potentially malicious custom BMC firmware stacks in some embodiments.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. Custom BMC firmware stacks, such as those developed according to the openBMC standards, are typically created by users whose development efforts are not closely controlled by the vendor of the IHS and as such, it may include logic that may not be aware of all of the intricacies of the IHS it is designed to manage. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL CORPORATION. On the other hand, custom BMC firmware stacks, which are typically developed in uncontrolled environments, often possess relatively higher levels of software faults (e.g., bugs) that can potentially cause harm or damage to their host IHSs if not managed properly.

IHS vendors would like to provide customers with the ability to deploy custom BMC firmware stacks on their BMC hardware. This ability, however, has heretofore hindered the vendor's control over certain storage areas (e.g., persistent storage, supervisory code, warranty logfiles, etc.) that should remain separate or hidden from the custom BMC firmware stacks. Embodiments of the present disclosure provide a monitoring mechanism to protect the server and notify the user when the BMC firmware stacks cause errant conditions. For example, the user may be notified by displaying a BIOS splash screen requesting that the user revert certain steps to protect the server when the custom BMC firmware stacks fail. Certain embodiments may also provide the user with options to override those warnings shown on the BIOS splash screen. The system may also be able to access a storage area that is secure, tamper proof and can be trusted by the vendor throughout some, most, or all of the entire lifecycle of the IHS's deployment.

For example, the IHS vendors would like to have a storage area, such as on the motherboard, on each IHS that is accessible by other trusted components in the IHS to store and retrieve runtime data. Examples include logs of warranty violation detection, notification and hardware protection actions, and other resources such as configuration files that can be consumed or accessed by certain resources of the IHS. The resources of the IHS and/or BMC that utilize such secure data can be construed to form a circle of trust among one another. Furthermore, the vendor may be provided with multiple, redundant interfaces to securely retrieve and authenticate the runtime data when required.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
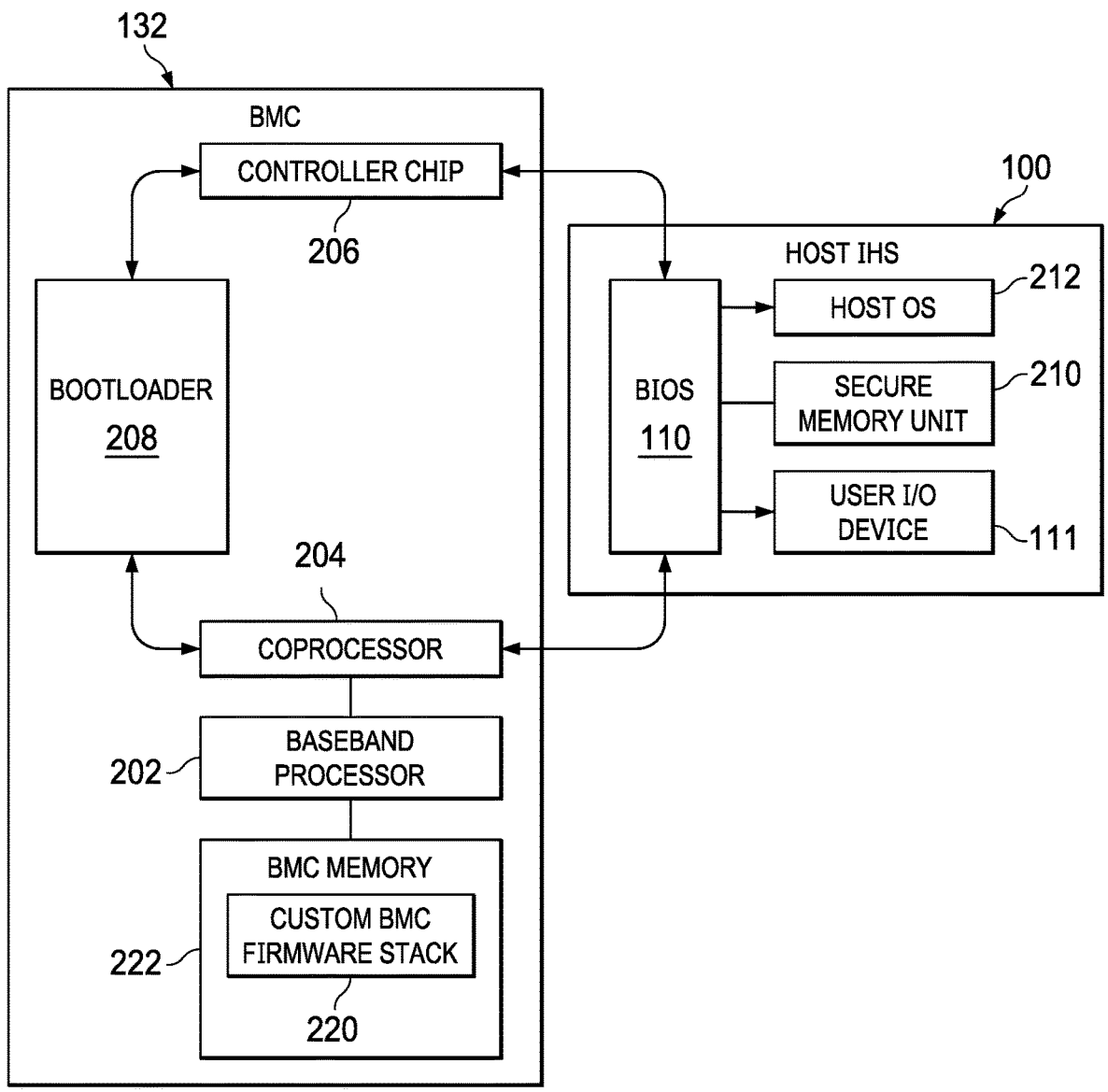
FIG. 2 illustrates several components of an example BMC along with those of an associated IHS 100 showing how those components may communicate with one another using a secure shared memory system according to one embodiment of the present disclosure.

FIG. 2 illustrates several components of an example BMC 132 along with those of an associated IHS 100 showing how those components may communicate with one another using a secure shared memory system 200 according to one embodiment of the present disclosure. The BMC 132 generally includes a baseboard processor 202, a coprocessor 204, a controller chip 206, and an executable bootloader 208 stored in a memory of the BMC 132. The IHS 100 on the other hand, is shown including a BIOS 110, a secure memory unit 210, a host OS 212, and a user I/O device 111, which may be, for example, a USB port. A controller chip 206 is also shown in communication with the host IHS 100 and BMC 132. The BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

Certain components shown above may provide a framework for implementing the BMC 132 with the IHS 100. That is, the baseboard processor 202, coprocessor 204, controller chip 206, and bootloader 208 collectively provide a system for monitoring the operation of the IHS 100 as well as controlling certain aspects of the IHS 100 for ensuring its proper operation. Nevertheless, it would be beneficial to provide a secure storage location that allows these components to communicate with one another to provide supervisory control over custom BMC firmware stacks that are deployed on the BMC 132 while remaining separate and hidden from those stacks. For example, the coprocessor 204 may be configured to perform out-of-band monitoring of the baseboard processor 202 using certain signals or information provided from the controller chip 206 and/or BIOS 110. Additionally, the bootloader 208 may access either of the coprocessor 204, controller chip 206, and/or BIOS 110 to acquire information about how the custom BMC firmware stack should be loaded onto the baseboard processor 202. As will be described in detail herein below, embodiments of the present disclosure could be construed to provide a circle-of-trust for either or all of the baseboard processor 202, coprocessor 204, controller chip 206, and/or bootloader 208 in which those components may communicate with one another for ensuring the proper operation of custom BMC firmware stacks deployed on the BMC 132.

IHS vendors would like to provide customers with the ability to deploy custom BMC firmware stacks on their BMC hardware. This ability, however, has heretofore hindered the vendor's control over certain storage areas (e.g., persistent storage, supervisory code, warranty logfiles, etc.) that should remain separate or hidden from the custom BMC firmware stacks. Embodiments of the present disclosure provide a monitoring mechanism to protect the server and notify the user when the BMC firmware stacks cause errant conditions. For example, the user may be notified by displaying a BIOS splash screen requesting that the user revert certain steps to protect the server when the custom BMC firmware stacks fail. Certain embodiments may also provide the user with options to override those warnings shown on the BIOS splash screen. The system may also be able to access a storage area that is secure, tamper proof and can be trusted by the vendor throughout some, most, or all of the entire lifecycle of the IHS's deployment.

Baseboard processor 202 may include any suitable type of processor, such as an advanced RISC machine (ARM) processor. Baseboard processor 202 executes a standard BMC firmware stack (not shown) or a custom BMC firmware stack 220 that is stored in a BMC memory 222. A standard BMC firmware stack may be, for example, an IHS vendor provided firmware stack (e.g., an iDRAC provided by the DELL CORPORATION), while the custom BMC firmware stack 220 may be one created by a user of the IHS, such as one implemented using the openBMC framework. The custom BMC firmware stack 220 may provide out-of-band monitoring and management of the components of the IHS 100. Examples of monitoring functions that the custom BMC firmware stack 220 may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to monitor its operations. In one embodiment, the baseboard processor 202 and coprocessor 204 may be provided together in a system on chip (SoC) device. In other embodiments, the baseboard processor 202 and coprocessor 204 may be provided as separate, discreet entities.

The bootloader 208 may include any type of executable code for launching or booting the custom BMC firmware stack 220 on the BMC 132. In one embodiment, the bootloader 208 includes a Universal boot loader (Das U-Boot), which is provided under an open source license, and is primarily adapted used in embedded processor devices to bootstrap the BMC firmware stack's operating system's kernel.

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

The bios 110 maintains a secure memory unit 210 that only it is allowed to access. That is, bios 110 functions as a proxy to receive read and write requests from either of the coprocessor 204 or controller chip 206, and service those requests by selectively providing access to the secure memory unit 210 by those components. In order to provide additional redundancy, the bios 110 may also provide selective access interfaces to the host OS 212 and user I/O device 111, such as a USB port. In the event of catastrophic failure of certain resources of the BMC 132, for example, the bios 110 may allow selective access to the secure memory unit 210 to either of the host OS 212 and/or the user I/O device 111.

In one embodiment, the secure memory unit 210 is allocated from at least a portion of a physical non-volatile memory device configured on the motherboard of the IHS 100. Allocating the secure memory unit 210 on the motherboard may provide a relatively permanent means of ensuring that any data stored on the secure memory unit 210 is not physically removed from the IHS 100, such as what could potentially occur if the secure memory unit 210 were to be allocated on the hard drive of the IHS 100 or on the BMC 132 itself.

Figure 3:
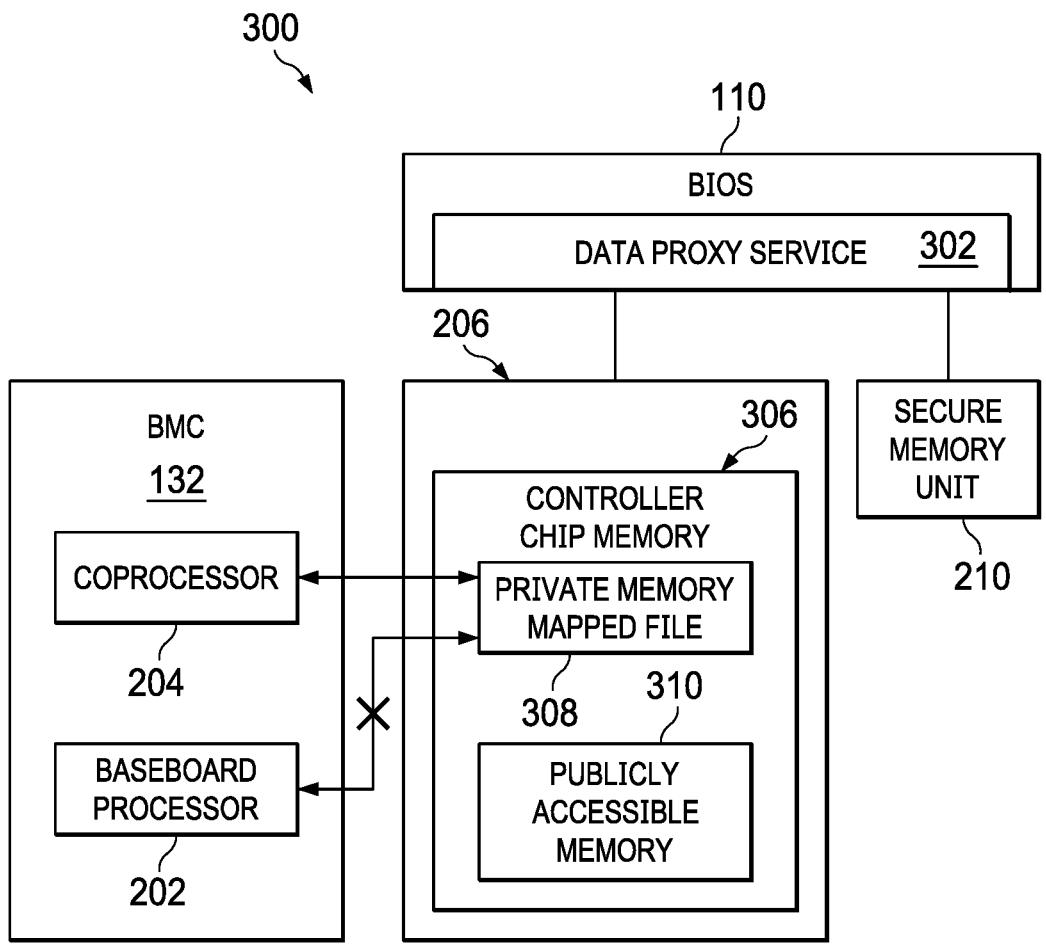
FIG. 3 illustrates an example IHS/BMC architecture that may be configured to provide a secure memory access technique using a private memory mapped file according to one embodiment of the present disclosure.

FIG. 3 illustrates an example IHS/BMC architecture 300 that may be configured to provide a secure memory access technique using a private memory mapped file according to one embodiment of the present disclosure. The architecture 300 includes bios 110, secure memory unit 210, controller chip 206, and BMC 132 that communicate with one another through a suitable interface, such as a serial peripheral interface (SPI). While the IHS/BMC architecture 300 used to provide a private memory map window only shows certain components for the purposes of brevity and clarity of discussion, it should be appreciated that the IHS/BMC architecture 300 may be configured with additional, fewer, or different components without departing from the spirit and scope of the present disclosure.

BIOS 110 includes a data proxy service 302 having instructions that are executed by a processor of the BIOS 110 for accessing the secure memory unit 210. In one embodiment, the secure memory unit 210 is configured such that only the data proxy service 302 is allowed to access its contents. In another embodiment, data proxy service 302 selectively responds to requests for accessing (e.g., reading or writing) the secure memory unit 210 from only certain resources of the BMC 132 or IHS 100.

The controller chip 206 includes executable logic for creating a private memory mapped file 308 within the controller chip memory 306. Thus, the controller chip memory 306 may be configured with a private memory mapped file 308 as well as publicly accessible memory 310 that is accessible by, for example, the custom BMC firmware stack executed on the baseboard processor 202. The private memory mapped file 308 generally comprises a data structure created by a memory manager of the controller chip 206 to map a region of the controller chip memory 306 to its process address space. The private memory mapped file 308 can be construed as a mailbox in which secure data may be transferred to and from the secure memory unit 210. More specifically, the memory manager of the controller chip 206 marks the private memory mapped file 308 as invalid from a typical processing perspective, but generates private memory mapped file access information (e.g., hooks or handles) that allows access to the contents of the private memory mapped file 308. The private memory mapped file access information, however, may be provided to those components of the BMC 132 and IRS 100 within the established circle-of-trust, namely the baseboard processor 202, coprocessor 204, controller chip 206, and/or bootloader 208. Thus, the contents of the private memory mapped file 308 are inaccessible by entities that do not have access to the private memory mapped file access information while being accessible to trusted components that do have access to the private memory mapped file information.

Although FIG. 3 describes one example of an architecture that may be configured to provide a secure memory access technique using a secure memory map file, the features of the disclosed architecture may be embodied in other specific forms without deviating from the spirit and scope of the present disclosure. For example, the IHS/BMC architecture 300 may include additional, fewer, or different components than those operations as described in the present example. As another example, although the bootloader 208 is not explicitly shown and described, it should be appreciated that it may be included in the circle-of-trust by, for example, using the coprocessor 204 as a proxy for accessing the contents of the secure memory unit 210. Additionally, other components of the BMC 132 and/or IHS 100 other than what is described herein may be included in the circle-of-trust by providing the private memory mapped file access information to those components.

Figure 4:
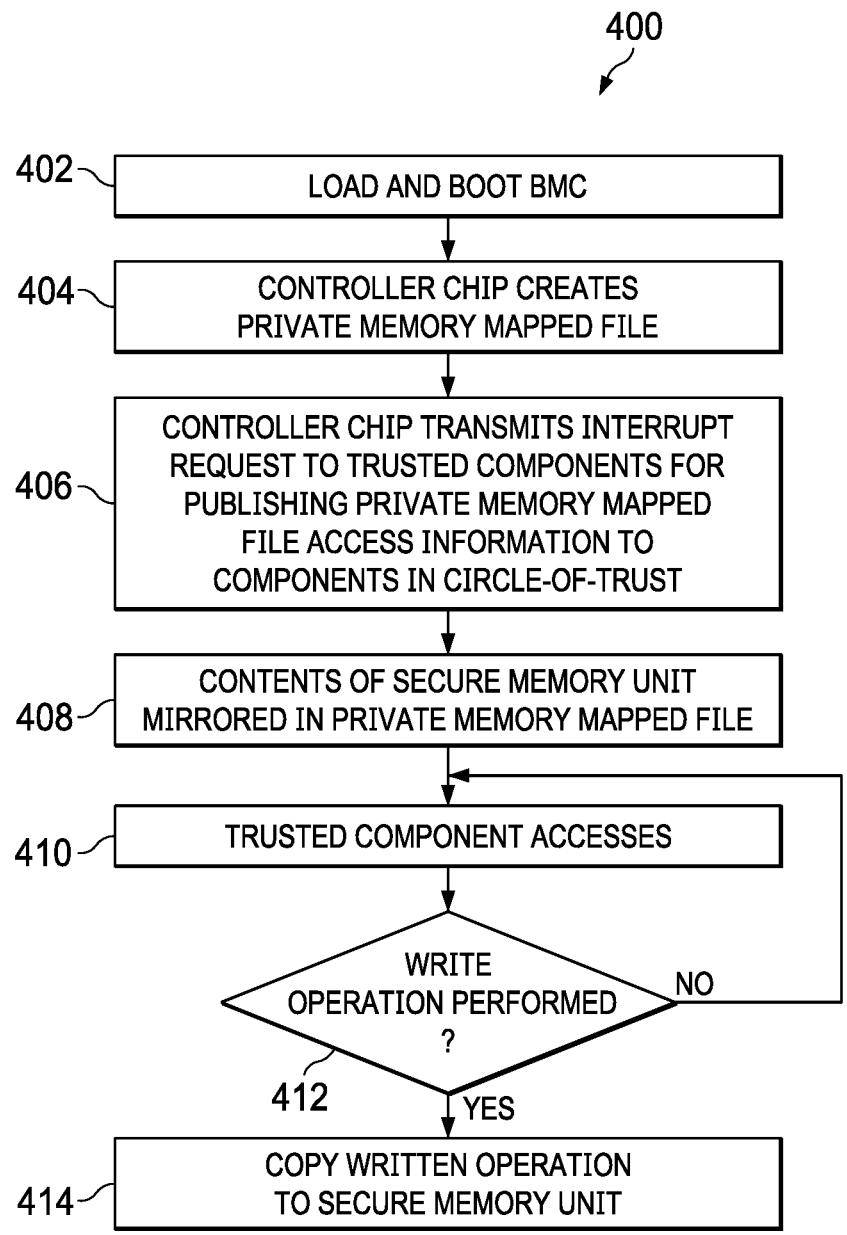
FIG. 4 illustrates an example secure memory access method that may be performed according to one embodiment of the present disclosure.

FIG. 4 illustrates an example secure memory access method 400 that may be performed according to one embodiment of the present disclosure. In one embodiment, the method 400 may be performed continually as the IHS 100 and BMC 132 are being used to provide a secure communication for each of a number of its trusted components.

At step 402, the BMC 132 is booted using a suitable bootloader, such as a Universal boot loader (Das U-Boot). At step 404, the controller chip 206 creates a private memory mapped file 308 in the controller chip memory 306. In one embodiment, the private memory mapped file 308 is created using a memory manager configured in the controller chip 206. Thereafter at step 406, the controller chip 206 transmits interrupt request messages to trusted components for publishing private memory mapped file access information to components in circle-of-trust. Examples of such components may include the baseboard processor 202, coprocessor 204, controller chip 206, and/or bootloader 208. In one embodiment, the controller chip 206 may configure its own processing system to enable access to the private memory mapped file 308.

At step 408, the contents of the secure memory unit 210 are mirrored (e.g., copied) to the private memory mapped file 308. For example, the controller chip 206 may access the BIOS 110 via the data proxy service 302 to retrieve some, most, or all data from the secure memory unit 210. At this point, all of the trusted components that have received the private memory mapped file access information should be able to retrieve data from and write data to the private memory mapped file 308.

At step 410, a trusted component accesses (e.g., reads or writes) certain contents of the private memory mapped file 308. The trusted component is allowed to do so because it sends the access information along with the request for access. It should be noted that other processes, such as the baseboard processor 202, is not allowed to do so because it does not possess the access information needed to access the private memory mapped file 308.

At step 412, the controller chip 206 determines whether or not a write operation was performed. If so, processing continues at step 414; otherwise, processing continues at step 410 to process other requests for access to private memory mapped file 308 by other trusted components. At step 414, the controller chip 206 communicates with the BIOS 110 to copy the written operation to the secure memory unit 210 so that it can be updated or mirrored to mimic the data stored in the private memory mapped file 308.

The secure memory access method 400 may be performed continually as the IHS 100 and BMC 132 are being used to provide a secure communication for each of a number of its trusted components. Nevertheless, when use of the method 400 is no longer needed or desired, the method 400 ends.

Although FIG. 4 describes one example of a method that may be performed for providing secure access to private data in a BMC 132 environment, the features of the disclosed process may be embodied in other specific forms without deviating from the spirit and scope of the present disclosure. For example, the method 400 may perform additional, fewer, or different operations than those operations as described in the present example. As another example, certain steps of the aforedescribed process may be performed by other components of the BMC 132 and/or IHS 100, such as by the coprocessor 204 configured on the BMC 132, or by the BIOS 110 executed on the IHS 100.

Figure 5:
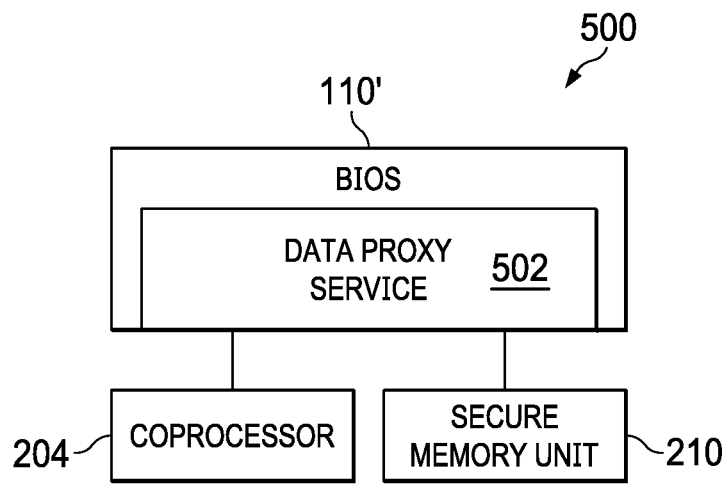
FIG. 5 illustrates another example IHS/BMC architecture that may be configured to provide a secure memory access technique using a dedicated private channel according to one embodiment of the present disclosure.

FIG. 5 illustrates another example IHS/BMC architecture 500 that may be configured to provide a secure memory access technique using a dedicated private channel according to one embodiment of the present disclosure. The IHS/BMC architecture 500 includes a bios 110' that communicates with a secure memory unit 210, and a coprocessor 204 via a suitable interface, such as a serial peripheral interface (SPI), a virtual UART, an I2C interface, and the like. While the IHS/BMC architecture 500 is shown herein with only a coprocessor 204 and secure memory unit 210 that communicates with the BIOS 110, it should be appreciated that other trusted components, such the controller chip 206, may be configured to perform similar features for providing a secure memory access without departing from the spirit and scope of the present disclosure.

BIOS 110' includes a data proxy service 502 that includes certain features that are similar in design and construction to the data proxy service 302 of FIG. 3. Such similar features, for example, may include that the data proxy service 502 is executed by the BIOS 110 for accessing the secure memory unit 210, it is the only entity that is allowed to access the contents of the secure memory unit 210, and that it selectively responds to requests for accessing (e.g., reading or writing) the secure memory unit 210 from only certain resources of the BMC 132 or IHS 100. The data proxy service 502 differs from that of the data proxy service 302, however, in that the data proxy service 502 uses a dedicated private channel among each of the trusted components for accessing the contents of the secure memory unit 210. For example, certain trusted components (e.g., baseboard processor 202, coprocessor 204, controller chip 206, and bootloader 208, etc.) may store and use a key exchange/sharing system of identity certificates (e.g., root certificates, public key certificates, etc.) that performs a cryptographic hash against requests in which the key is known and recognized by the data proxy service 302 for responding to those requests possessing the proper key. According to the present embodiment, the data proxy service 502 is executed by the BIOS 110 to communicate with the trusted components (e.g., baseboard processor 202, coprocessor 204, controller chip 206, and bootloader 208) using identity certificates stored on those trusted components.

Although FIG. 5 describes one example of an architecture that may be configured to provide a secure memory access technique using a dedicated private channel, the features of the disclosed architecture may be embodied in other specific forms without deviating from the spirit and scope of the present disclosure. For example, the IHS/BMC architecture 500 may include additional, fewer, or different components than those operations as described in the present example. As another example, although other trusted components, such as the controller chip 206 and bootloader 208 are not explicitly shown and described, it should be appreciated that they may be included in the circle-of-trust by, for example, providing those components with the identity certificates. Additionally, other components of the BMC 132 and/or IHS 100 other than what is described herein may be included in the circle-of-trust by providing the identity certificates to those components.

Figure 6:
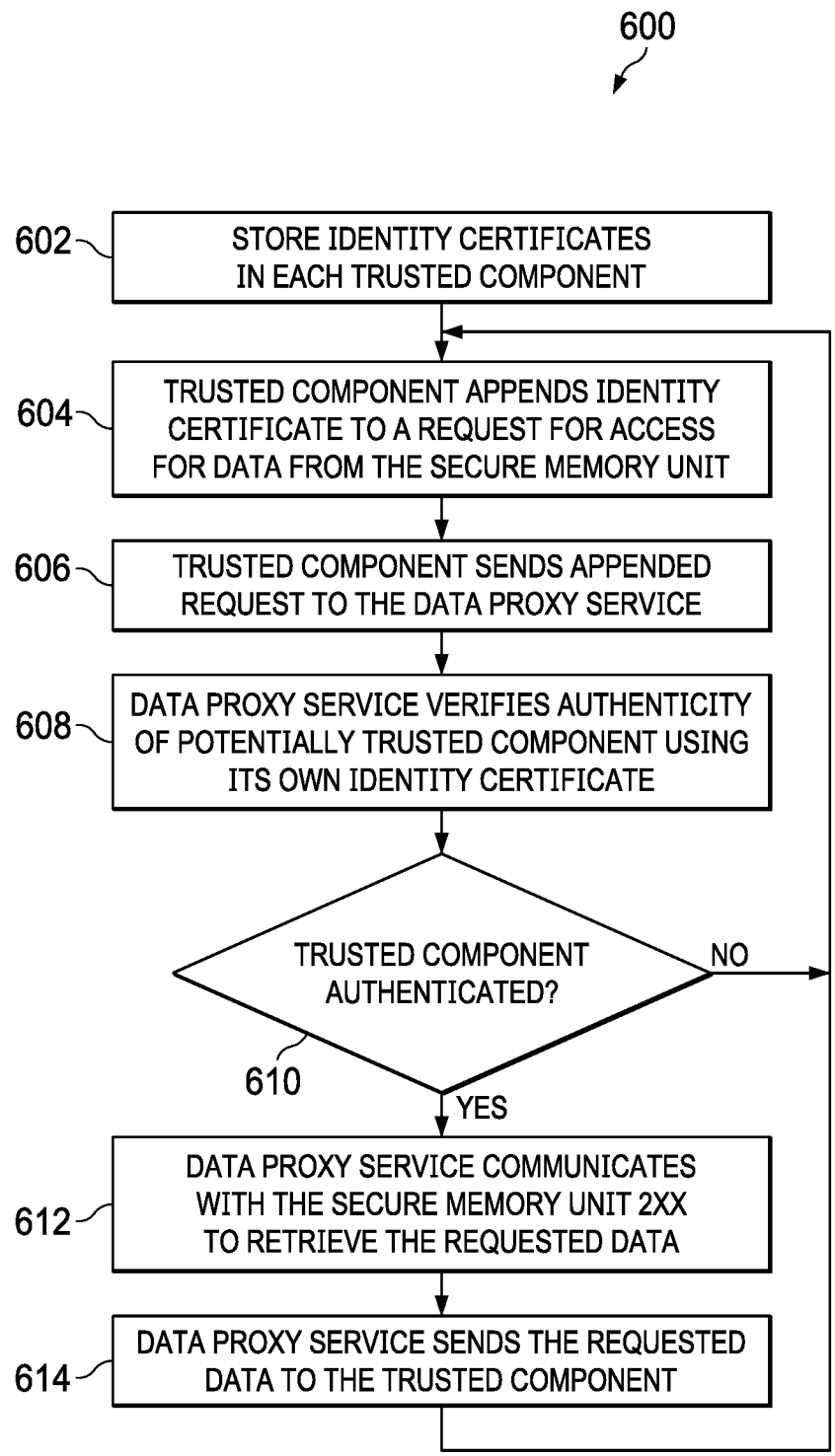
FIG. 6 illustrates another example secure memory access method that may provide secure communication via identity certificates according to one embodiment of the present disclosure.

FIG. 6 illustrates another example secure memory access method 600 that may provide secure communication via identity certificates according to one embodiment of the present disclosure. In one embodiment, the method 600 may be performed continually as the IHS 100 and BMC 132 are being used to provide secure communications for each of a number of its trusted components.

At step 602, identity certificates are stored in each of the trusted components (e.g., baseboard processor 202, coprocessor 204, controller chip 206, and bootloader 208). In one embodiment, the identity certificates are stored in the trusted components when executable software is installed or otherwise loaded onto those components. In another embodiment, the identity certificates may be changed (i.e., new identity certificates) at ongoing intervals. For example, new identity certificates may be issued to each trusted component by the bootloader 208 each time the BMC 132 is re-started. At step 604, A trusted component appends its received identity certificate to a request for access for data from the secure memory unit, and sends the appended request to the data proxy service 302 at step 606.

At step 608, the data proxy service verifies the authenticity of the potentially trusted component using its own identity certificate stored in a memory of the BIOS 110. Thereafter at step 610, the data proxy service determines whether or not that the component is authenticated. If not, the request is discarded and processing continues at step 604 to process other requests for access to the secure memory unit 210. If the component is authenticated, however, processing continues at step 612.

At step 612, the data proxy service communicates with the secure memory unit 210 to retrieve the requested data, and sends the requested data to the trusted component at step 614. After processing step 614, the method 600 continues at step 604 to process other requests for access to the secure memory unit 210.

The secure memory access method 600 may be performed continually as the IHS 100 and BMC 132 are being used to provide a secure communication for each of a number of its trusted components. Nevertheless, when use of the method 600 is no longer needed or desired, the method 600 ends.

Although FIG. 6 describes one example of a method that may be performed for providing secure access to private data in a BMC 132 environment, the features of the disclosed process may be embodied in other specific forms without deviating from the spirit and scope of the present disclosure. For example, the method 600 may perform additional, fewer, or different operations than those operations as described in the present example. As another example, certain steps of the aforedescribed process may be performed by other components of the BMC 132 and/or IHS 100, such as by one or more of the processors 102 of the IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices; and
a Baseboard Management Controller (BMC) in communication with the plurality of hardware devices, the BMC comprising:
a system on chip (SoC) device configured to execute first instructions stored in a first memory unit to execute a custom BMC firmware stack; and
a second processor configured to execute second instructions stored in a second memory unit to:
access a secure memory unit in a Basic Input/Output System (BIOS) of the IHS using a secure memory access technique, wherein access to the secure memory unit is only allowed via the secure memory access technique;
wherein the SoC device is restricted from accessing the secure memory unit using the secure memory access technique; and
a third processor configured to execute third instructions stored in a third memory unit to assist the SoC device in performing one or more functions associated with the operation of the BMC, wherein the second instructions are further executed to:
create a memory mapped file in the second memory unit;
copy data stored in the secure memory unit to the memory mapped file;
when the third processor requests at least a portion of the data, send the requested portion of data to the third instructions; and
when the third processor requests to write the portion of data, write the portion of data in the memory mapped file and communicate with the BIOS to update the portion of data in the secure memory unit.

2. The IHS of claim 1, wherein the second instructions are further executed to send information associated with the memory mapped file to the third processor when the memory mapped file is created, the third processor using the information to request the portion of data.

3. The IHS of claim 1, wherein the third instructions are further executed to convey the portion of data to a bootloader, the bootloader executed to boot the custom BMC firmware stack.

4. The IHS of claim 1, wherein the SoC device comprises an advanced RISC machine (ARM) processor, the second processor comprises a coprocessor, and the third processor comprises a complex programmable logic device (CPLD).

5. The IHS of claim 1, wherein the second instructions are further executed to:
receive a request to read or write at least a portion of the data from the third processor, the request including an identity certificate stored in the third memory;
when the identity certificate is valid, communicate with the BIOS to read or write the portion of data in the secure memory unit according to the received request.

6. The IHS of claim 5, wherein the BIOS is configured to access the portion of data using a proxy process.

7. The IHS of claim 5, wherein the second instructions are configured to issue different identity certificates to the third processor at ongoing intervals.

8. A method comprising:
executing, using instructions stored in one or more memory units and executed by one or more processors, a custom BMC firmware stack using a System on Chip (SoC) device configured on a baseboard management controller (BMC); and
using a second processor:
accessing, using the instructions, a secure memory unit in a Basic Input/Output System (BIOS) of an Information Handling System (HIS) using a secure memory access technique, wherein access to the secure memory unit is only allowed via the secure memory access technique;
restricting, using the instructions, access by the SoC device from accessing the secure memory unit using the secure memory access technique;
assisting, by a third processor, the SoC device in performing one or more functions associated with the operation of the BMC, the third processor configured on the system on chip (SoC) device; and
by the second processor:

creating a memory mapped file in the second memory unit;

copying data stored in the secure memory unit to the memory mapped file;

when the third processor request at least a portion of the data, sending the requested portion of data to the third instructions; and when the third processor requests to write the portion of data, writing the portion of data in the memory mapped file and communicate with the BIOS to update the portion of data in the secure memory unit.

9. The method of claim 8, further comprising sending, by the second processor, information associated with the memory mapped file to the third processor when the memory mapped file is created, the third processor using the information to request the portion of data.

10. The method of claim 8, wherein the third instructions are further executed to convey the portion of data to a bootloader, the bootloader executed to boot the custom BMC firmware stack.

11. The method of claim 8, further comprising by the second processor:

receiving a request to read or write at least a portion of the data from the third processor, the request including an identity certificate stored in the third memory;

when the identity certificate is valid, communicating with the BIOS to read or write the portion of data in the secure memory unit according to the received request.

12. The method of claim 11, further comprising accessing, by the BIOS, the portion of data using a proxy process.

13. The method of claim 11, further comprising by the second processor, issuing different identity certificates to the third processor at ongoing intervals.

14. A Baseboard Management Controller (BMC) comprising:

a System on Chip (SoC) device configured to execute first instructions stored in a first memory unit to execute a custom BMC firmware stack, the BMC in communication with the plurality of hardware devices of an Information Handling System (IHS); and a second processor configured to execute second instructions stored in a second memory unit to:

access a secure memory unit in a Basic Input/Output System (BIOS) of the IHS using a secure memory access technique, wherein access to the secure memory unit is only allowed via the secure memory access technique;

wherein the SoC device is restricted from accessing the secure memory unit using the secure memory access technique; and a third processor configured to execute third instructions stored in a third memory unit to assist the SoC device in performing one or more functions associated with the operation of the BMC, wherein the second instructions are further executed to:

create a memory mapped file in the second memory unit;

copy data stored in the secure memory unit to the memory mapped file;

when the third processor request at least a portion of the data, send the requested portion of data to the third instructions; and when the third processor request to write the portion of data, write the portion of data in the memory mapped file and communicate with the BIOS to update the portion of data in the secure memory unit.

15. The BMC of claim 14, wherein the second instructions are further executed to send information associated with the memory mapped file to the third processor when the memory mapped file is created, the third processor using the information to request the portion of data.

16. The BMC of claim 14, wherein the third instructions are further executed to convey the portion of data to a bootloader, the bootloader executed to boot the custom BMC firmware stack.

17. The BMC of claim 14, wherein the SoC device comprises an advanced RISC machine (ARM) processor, the second processor comprises a coprocessor, and the third processor comprises a complex programmable logic device (CPLD).

18. The BMC of claim 14, wherein the second instructions are further executed to:

receive a request to read or write at least a portion of the data from the third processor, the request including an identity certificate stored in the third memory;

when the identity certificate is valid, communicate with the BIOS to read or write the portion of data in the secure memory unit according to the received request.

19. The BMC of claim 18, wherein the BIOS is configured to access the portion of data using a proxy process.

20. The BMC of claim 18, wherein the second instructions are configured to issue different identity certificates to the third processor at ongoing intervals.

* * * * *